US009767739B2

(12) United States Patent

Zhang et al.

(10) Patent No.: US 9,767,739 B2

(45) Date of Patent: Sep. 19, 2017

(54) DRIVING CIRCUIT FOR ELECTROPHORETIC DISPLAY, IMPLEMENTATION METHOD THEREOF AND ELECTROPHORETIC DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zhengxin Zhang, Beijing (CN); Yi Zheng, Beijing (CN); Shuai Xu, Beijing (CN); Yao Yu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 210 days.

(21) Appl. No.: 14/365,825

(22) PCT Filed: May 21, 2013

(86) PCT No.: PCT/CN2013/075987

§ 371 (c)(1),
(2) Date: Jun. 16, 2014

(87) PCT Pub. No.: WO2014/153824

PCT Pub. Date: Oct. 2, 2014

(65) Prior Publication Data

US 2016/0140908 A1 May 19, 2016

(30) Foreign Application Priority Data

Mar. 25, 2013 (CN) ......................... 2013 1 0098058

(51) Int. Cl.
*G09G 3/34* (2006.01)
*G02F 1/167* (2006.01)
*G09G 3/20* (2006.01)

(52) U.S. Cl.
CPC ............ *G09G 3/344* (2013.01); *G02F 1/167* (2013.01); *G09G 3/2014* (2013.01);
(Continued)

(58) Field of Classification Search
CPC ...................................................... G09G 3/344
See application file for complete search history.

(56) References Cited

U.S. PATENT DOCUMENTS 6,803,899 B1 * 10/2004 Masazumi ........... G09G 3/3629 345/101
2002/0036616 A1 * 3/2002 Inoue ..................... G02F 1/167 345/107

(Continued)

FOREIGN PATENT DOCUMENTS

CN 1656531 A 8/2005
CN 1963907 A 5/2007

(Continued)

OTHER PUBLICATIONS

First Chinese Office Action Appln. No. 201310098058.X; Dated Sep. 29, 2015.

(Continued)

*Primary Examiner* — Kent Chang
*Assistant Examiner* — Scott Au
(74) *Attorney, Agent, or Firm* — Ladas & Parry LLP

(57) ABSTRACT

The present disclosure discloses a driving circuit for electrophoretic display, including a data line driving integrated circuit and a gate line driving integrated circuit, characterized in that the output terminal of each data line in the data line driving integrated circuit is configured with a modula- (Continued)

tion unit including a thermosensitive element, and the modulation unit adjusts the pulse width of the voltage signal outputted at the output terminal of the data line according to change of temperature to realize temperature compensation for the dielectric characteristic of the electrophoretic film of the electrophoretic display. The present disclosure also discloses an implementation method of the driving circuit and an electrophoretic display device. According to the present disclosure, the workload of the early stage experiment process of the product design can be saved, the production efficiency of the products can be improved, and the storage space of the chip can also be saved.

11 Claims, 5 Drawing Sheets

(52) U.S. Cl.
CPC ............... *G09G 2300/0426* (2013.01); *G09G 2310/0275* (2013.01); *G09G 2310/061* (2013.01); *G09G 2320/041* (2013.01)

(56) References Cited

U.S. PATENT DOCUMENTS

| | | | | |
|---|---|---|---|---|
| 2003/0107546 A1* | 6/2003 | Ham | G09G 3/3648 | 345/101 |
| 2005/0162377 A1 | 7/2005 | Zhou et al. | | |
| 2005/0162378 A1* | 7/2005 | Zhou | G09G 3/344 | 345/107 |
| 2005/0190171 A1* | 9/2005 | Jang | G09G 3/3406 | 345/204 |
| 2009/0267888 A1* | 10/2009 | Lo | G09G 3/3648 | 345/101 |
| 2010/0127966 A1* | 5/2010 | Miyamoto | G09G 3/344 | 345/107 |
| 2012/0087389 A1 | 4/2012 | Howe et al. | | |
| 2012/0139891 A1* | 6/2012 | Murayama | G09G 3/344 | 345/212 |
| 2013/0106827 A1 | 5/2013 | Zhao et al. | | |

FOREIGN PATENT DOCUMENTS

| | | | |
|---|---|---|---|
| CN | 101986380 | A | 3/2011 |
| CN | 102316627 | A | 1/2012 |
| CN | 102368381 | A | 3/2012 |
| CN | 102486915 | A | 6/2012 |
| EP | 2 461 313 | A2 | 6/2012 |
| JP | 62131234 | A | 6/1987 |
| JP | 2004-219933 | A | 8/2004 |
| JP | 2005-527001 | A | 9/2005 |
| JP | 2011-128219 | A | 6/2011 |
| JP | 2012-014833 | A | 1/2012 |
| KR | 20040093124 | A | 11/2004 |

OTHER PUBLICATIONS

Written Opinion of the International Searching Authority dated Dec. 23, 2013; PCT/CN2013/075987.

Second Korean Office Action Appln. No. 10-2014-7017848; Dated Jan. 30, 2016.

Extended European Search Report dated Jul. 8, 2016; Appln. No. 13861498.7-1904 /2980641; PCT/CN2013075987.

Korean Office Action dated Jul. 29, 2016; Appln. No. 10-2014-7017848.

Korean Office Action dated Oct. 27, 2016; Appln. No. 10-2014-7017848.

Japanese Office Action dated Jan. 30, 2017; Appln. No. 2016-503513.

Office Action from the EPO dated Jun. 6, 2017; Appln. No. 13 861 498.7-1914.

* cited by examiner

DRIVING CIRCUIT FOR ELECTROPHORETIC DISPLAY, IMPLEMENTATION METHOD THEREOF AND ELECTROPHORETIC DISPLAY DEVICE

TECHNICAL FIELD OF THE DISCLOSURE

The present disclosure relates to the technical field of display, and in particular, to a driving circuit for electrophoretic display, an implementation method thereof, and an electrophoretic display device.

BACKGROUND

As a new display technology, the electrophoretic display device has advantages such as reflective light emitting, low power consumption, super lightness, super thinness, capability of keeping the display state for a long time after power off, and so on. Currently, the electrophoretic display device has been widely used in the fields of electronic book, electronic tag, etc, and has very good market prospect.

An electrophoretic display device typically comprises an array substrate, an opposite substrate (or referred to as protection plate), display medium such as electrophoretic film arranged between the array substrate and the opposite substrate, a peripheral driving circuit, and so on. The peripheral driving circuit comprises a data line driving integrated circuit (IC) and a gate line driving integrated circuit. As shown in FIG. 1, the electrophoretic film comprises multiple micro-capsules 1. Each micro-capsule 1 contains white particles 2 with positive charges and black particles 3 with negative charges floating in liquid. The micro-capsules 1 are sandwiched between the upper substrate 4 (opposite substrate) and the lower substrate 5 (array substrate). When the lower substrate 5 is applied with a positive electric field, the white particles with positive charges move to the top of the micro-capsules 1, and the corresponding locations are shown as white. On the contrary, when the lower substrate 5 is applied with a negative electric field, the black particles with negative charges move to the top of the micro-capsules 1, and the corresponding locations are shown as black.

Currently, the gray levels of the electrophoretic display are implemented by applying voltage pulses of a particular period, which can be expressed as NGrad=time×Voltage, where NGrad is the gray level, time is the voltage pulse time, and Voltage is the voltage on the data line. The voltage on the data line is typically fixed at 0V or ±15V, and the displayed gray level is determined by the voltage pulse time. In other words, the longer the voltage pulse time, the higher the brightness, and vice versa, as shown in FIG. 2.

However, because the dielectric characteristic of the electrophoretic film changes with the temperature, in the prior art, each type of electrophoretic film is provided with a look up table corresponding thereto. The relationship between the displayed gray levels and the voltage pulse widths is stored in the look up table. According to the temperature characteristic of the electrophoretic film, the required voltage pulse time is different for a different temperature, i.e., the voltage pulse width is also different. In general, in order to display the same gray level, the driving voltage pulse time required for a high temperature is shorter than the driving voltage pulse time required for a low temperature, i.e., the voltage pulse width is smaller.

In the prior art, in order to make the look up table of the electrophoretic film, it is needed to measure the dielectric characteristics of the electrophoretic film under different temperatures, calculate the required voltage pulse widths, and then store the correspondence between the temperatures and the voltage pulse widths in a chip as the look up table for subsequently driving the electrophoretic display device. However, with the prior art, the workload for the experiments on the temperature characteristics of the electrophoretic film is large, resulting in low production efficiency and occupying storage space.

SUMMARY

In view of the above, the main object of the present disclosure is to provide a driving circuit for electrophoretic display, a driving method thereof, and an electrophoretic display device, which can save workload of the early stage experiment process of the product design, improve the production efficiency and also save the storage space of the chip.

In order to achieve the above object, the technical solutions of the present disclosure are implemented as follows.

In an embodiment of the present disclosure, there is provided a driving circuit for electrophoretic display, comprising a data line driving integrated circuit and a gate line driving integrated circuit, wherein the output terminal of every data line in the data line driving integrated circuit is configured with a modulation unit comprising a thermosensitive element. The modulation unit adjusts the pulse width of the voltage signal outputted at the output terminal of the data line according to change of temperature to realize temperature compensation for the dielectric characteristic of the electrophoretic film of the electrophoretic display.

In an example, one terminal of the modulation unit is connected to the output terminal of the data line of the data line driving integrated circuit, and the other terminal of the modulation unit is grounded.

In an example, the curvature of the curve of the response time of the modulation unit with respect to temperature is reverse to the curvature of the curve of the response time of the electrophoretic film with respect to the temperature.

In an example, the thermosensitive element is a thermosensitive resistor or a thermosensitive capacitor.

In an example, the thermosensitive resistor is a nonlinear thermosensitive resistor with a positive temperature coefficient.

In an example, the modulation unit is formed by connecting a thermosensitive resistor with a capacitor in parallel, or by connecting a thermosensitive resistor series consisted of multiple thermosensitive resistors with a capacitor in parallel.

In an example, the thermosensitive capacitor is a nonlinear thermosensitive capacitor with a positive temperature coefficient.

In an example, the modulation unit is formed by connecting a resistor with a thermosensitive capacitor in parallel.

In an embodiment of the present disclosure, there is further provided an electrophoretic display device comprising an array substrate, an electrophoretic film and a peripheral driving circuit, wherein the peripheral driving circuit is the driving circuit described in the above.

In an embodiment of the present disclosure, there is further provided an implementation method of a driving circuit for electrophoretic display, comprising: determining the curve of the response time of an electrophoretic film with respect to temperature; designing a modulation unit and selecting a suitable thermosensitive element according to the curve of the response time of the electrophoretic film with respect to the temperature; and arranging the modulation unit at the output terminal of a data line of a data line driving integrated circuit, wherein the curvature of the curve of the response time of the modulation unit with respect to the temperature is reverse to the curvature of the curve of the response time of the electrophoretic film with respect to the temperature.

According to the driving circuit for electrophoretic display, implementation method thereof, and the electrophoretic display device, the output terminal of the data line of the data line driving integrated circuit is configured with a modulation unit, and the curvature of the curve of the response time of the modulation unit with respect to the temperature is reverse to the curvature of the curve of the response time of the electrophoretic film with respect to the temperature. According to the present disclosure, the voltage signal waveform is changed due to the change of the characteristic of the thermosensitive element in the modulation unit in the driving circuit with respect to the temperature, such that the waveform change of the voltage signal outputted through the modulation unit coincides with the temperature characteristic of the electrophoretic film, achieving the temperature compensation of the electrophoretic display device finally. According to the present disclosure, the look up table is not needed, and thus it is not necessary to measure the dielectric characteristics of different kinds of electrophoretic films under different temperatures respectively. It is only needed to design a suitable modulation unit in advance according to the temperature characteristic curve of the electrophoretic film, such that the curvature of the curve of the response time of the modulation unit with respect to the temperature is reverse to the curvature of the curve of the response time of the electrophoretic film with respect to the temperature. Therefore, according to the present disclosure, the workload of the early stage experiment process of the product design can be saved, the production efficiency of the products can be improved, and the storage space of the chip can also be saved.

DETAILED DESCRIPTION

The basic concept of the present disclosure is that: the output terminal of the data line in the data line driving integrated circuit is configured with a modulation unit comprising a thermosensitive element, and the modulation unit adjusts the pulse width of the voltage signal according to change of temperature to realize temperature compensation for the dielectric characteristic of the electrophoretic film of the electrophoretic display.

The temperature compensation refers to compensation for the influence of temperature on the dielectric characteristic of the electrophoretic film. The electrophoretic film comprises micro-capsules which contain black and white particles and solvent. The dielectric characteristic of the electrophoretic film in practice refers to the dielectric characteristic of the micro-capsules.

The curvature of the curve of the response time of the modulation unit with respect to temperature is reverse to the curvature of the curve of the response time of the electrophoretic film with respect to the temperature. The modulation unit can be configured at the output terminal of each data line of the data line driving integrated circuit. In the following, the present disclosure will be described by taking that the modulation unit is configured at the output terminal of each data line of the data line driving integrated circuit as an example.

The thermosensitive element can be a thermosensitive resistor or a thermosensitive capacitor. A simple circuit is formed by connecting a thermosensitive resistor with a capacitor in parallel, or by connecting a resistor with a thermosensitive capacitor in parallel. Other forms are possible, for example, forming a thermosensitive resistor series by multiple thermosensitive resistors. Other elements can also be included.

Next, taking that the modulation unit is formed by connecting a thermosensitive resistor with a capacitor in parallel as an example, the present disclosure is further described in detail in connection with the drawings and specific embodiments.

Figure 1:
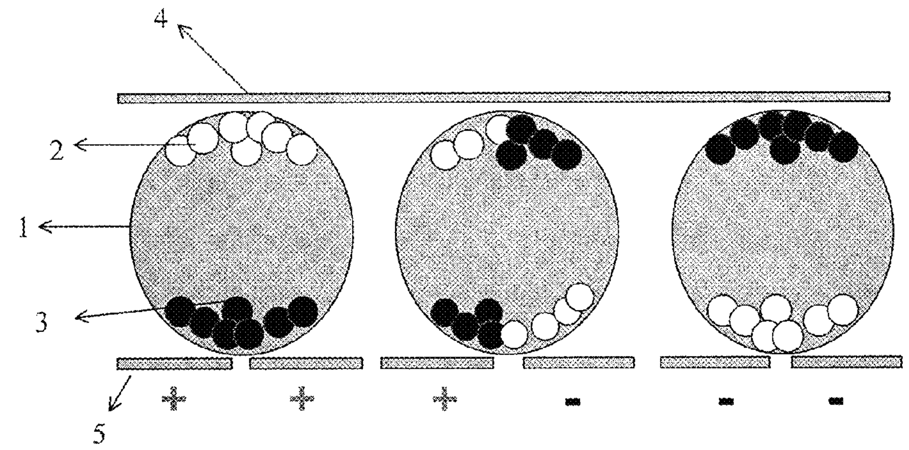
FIG. 1 is a schematic diagram of a partial cross section of an electrophoretic display device in the prior art.
Figure 2:
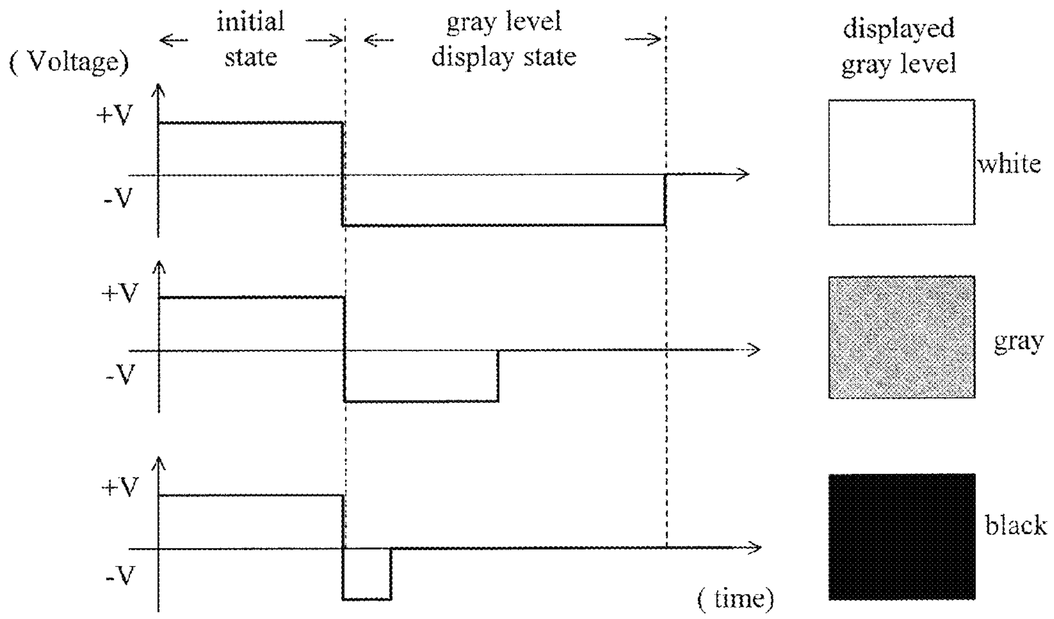
FIG. 2 is the correspondence between the displayed gray level and the voltage pulse time in the electrophoretic display device in the prior art.
Figure 3:
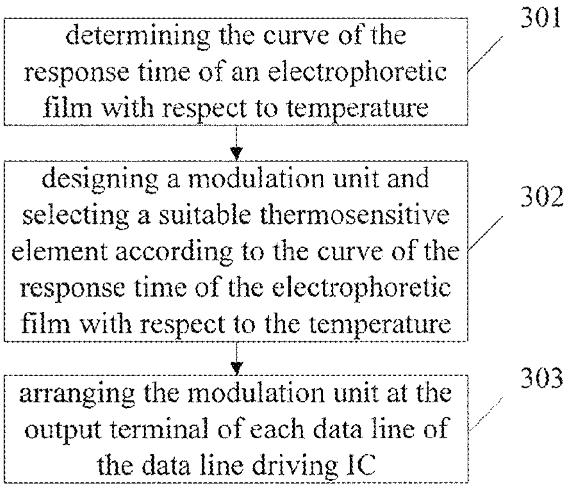
FIG. 3 is a schematic flowchart of an implementation method of a driving circuit for electrophoretic display according to an embodiment of the present disclosure.

FIG. 3 is a schematic flowchart of an implementation method of a driving circuit for an electrophoretic display device according to an embodiment of the present disclosure. As shown in FIG. 3, the implementation method comprises the following steps.

At step 301, the curve of the response time of an electrophoretic film with respect to the temperature is determined.

Figure 4:
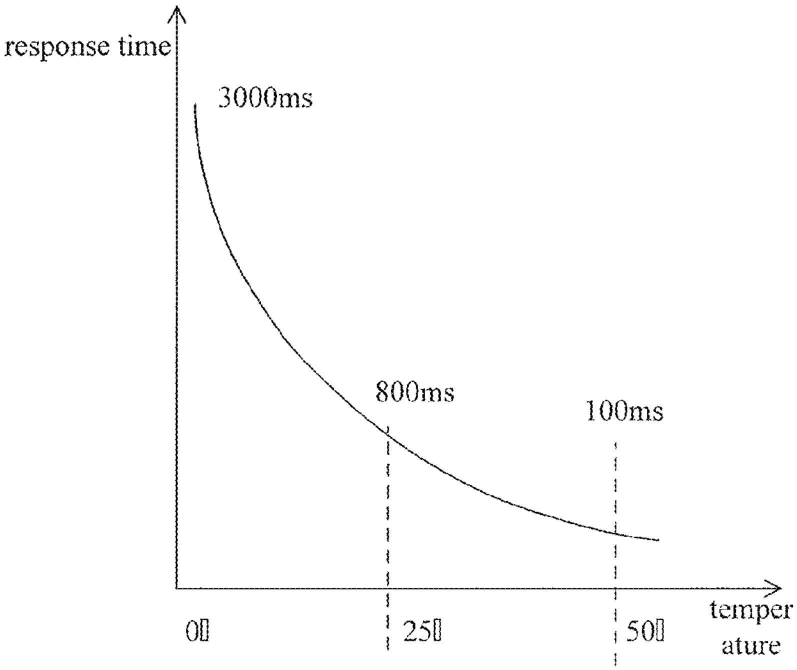
FIG. 4 is a curve diagram of the response time of an electrophoretic film with respect to temperature according to an embodiment of the present disclosure.

Here, the curve of the response time of the electrophoretic film with respect to the temperature is an inherent property of the electrophoretic film and is provided by the electrophoretic film manufacturer. As shown in FIG. 4, when the temperature drops from 50□ to 0□, the response time of the electrophoretic film would increase from 100 ms to 3000 ms (the time for displaying black or white). In other words, the response time of the electrophoretic film decreases as the temperature increases. The subsequent selection of the thermosensitive resistor is based on the curve of the response time of the electrophoretic film with respect to the temperature. The response time of the electrophoretic film refers to the time required by the black or white particles in the micro-capsule to move from the bottom of the micro-capsule to the top or from the tope to the bottom.

At step 302, a modulation unit is designed and a suitable thermosensitive element is selected according to the curve of the response time of the electrophoretic film with respect to the temperature.

In the present embodiment, a modulation unit formed by connecting a thermosensitive resistor and a capacitor in parallel is selected and the selected thermosensitive element is a thermosensitive resistor. In particular, as can be seen from FIG. 4, the response time of the electrophoretic film increases as the temperature decreases. If the temperature changes, the response time of the electrophoretic film would change by the order of microsecond. In this case, if the pulse width of the waveform of the voltage signal does not change, the displayed gray level would change. Therefore, when the temperature increases, if the displayed gray level needs to be kept unchanged, the pulse width of the waveform of the voltage signal needs to be increased, that is, the voltage pulse width of the output terminal of the data line driving IC needs to be increased, i.e., increasing the delay of the voltage waveform.

Here, based on the above analysis, it is possible to select a RC delay circuit consisted of a resistor (R) and a capacitor (C) as the modulation unit. As can be known, the time constant of the RC delay circuit is $\tau$=RC, $\tau$ determines the charging/discharging time of the delay circuit. The larger the value of $\tau$ is, the larger the waveform delay is.

Figure 5:
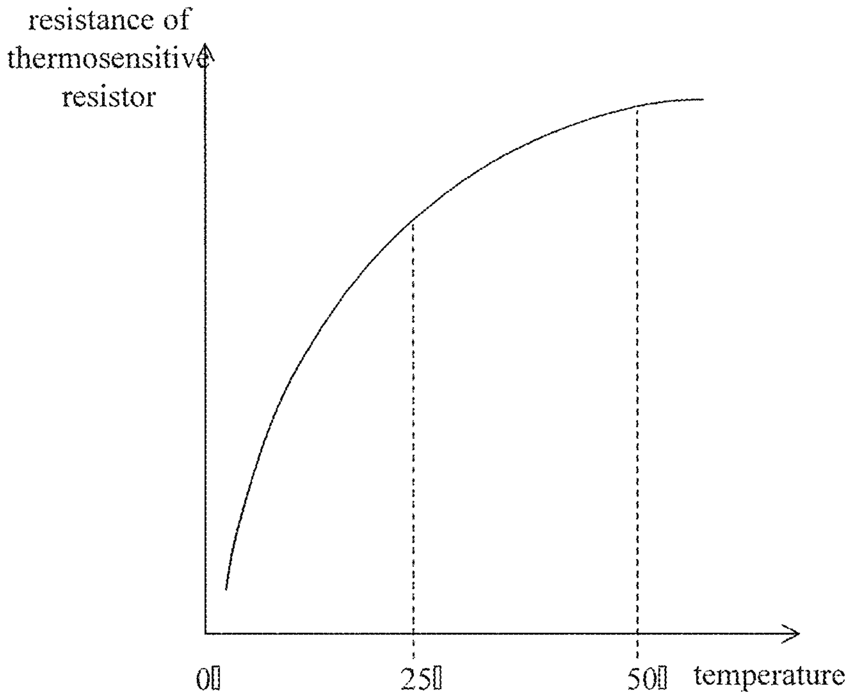
FIG. 5 is a curve diagram of the resistance value of a thermosensitive resistor with respect to temperature according to an embodiment of the present disclosure.

As measured by experiments, if the voltage needs to be charged to U=15V, and the time for charging to 99% U (which is usually used for theoretical calculation) is 5$\tau$=5RC, then 5RC is the response time for the voltage to pass the RC delay circuit. The response time is defined as the response time of the modulation unit. It can be seen from the equation that the response time of the modulation unit is proportional to R and C. Here, a thermosensitive resistor and a capacitor are connected in parallel to form the modulation unit. The thermosensitive resistor is a nonlinear thermosensitive resistor with a positive temperature coefficient. The curve along which the resistance of the thermosensitive resistor changes with the temperature is as shown in FIG. 5. The thermosensitive resistor with a positive temperature coefficient refers to that the resistance of the thermosensitive resistor increases as the temperature increases, and the response time of the corresponding RC delay circuit also increases. The change trend is right opposite to the trend with which the response time of the electrophoretic film changes with the temperature.

In a practical design procedure, the RC value can be adjusted according to the curve of the response time with respect to the temperature. For the modulation unit consisted of a thermosensitive resistor and a capacitor, the value of C is fixed, but the value of the thermosensitive resistor R increases as the temperature increases. Therefore, the change of the response time of the RC delay circuit is directly related to, i.e., proportional to the change of the resistance of the thermosensitive resistor. Further, since the response time of the electrophoretic film decreases as the temperature increases, in order to perform temperature compensation for the electrophoretic film, the response time of the modulation unit should be made to increase with the increasing of the temperature. In other words, the curvature of the curve of the response time of the modulation unit with respect to the temperature is made to be reverse to the curvature of the curve of the response time of the electrophoretic film with respect to the temperature.

For the present embodiment, the curvature of the curve of the resistance of the thermosensitive resistor with respect to the temperature should be made to be reverse to the curvature of the curve of the response time of the electrophoretic film with respect to the temperature, as shown in FIG. 4 and FIG. 5. As such, it is only needed to select a suitable thermosensitive resistor in advance according to the temperature characteristic curve of the electrophoretic film, such that the curvature of the temperature characteristic curve of the thermosensitive resistor is reverse to the curvature of the temperature characteristic curve of the electrophoretic film. Thus, with the change of the temperature, the resistance of the thermosensitive resistor changes, and the response time of the RC delay circuit changes, such that the width of the voltage pulse is further changed.

Figure 6:
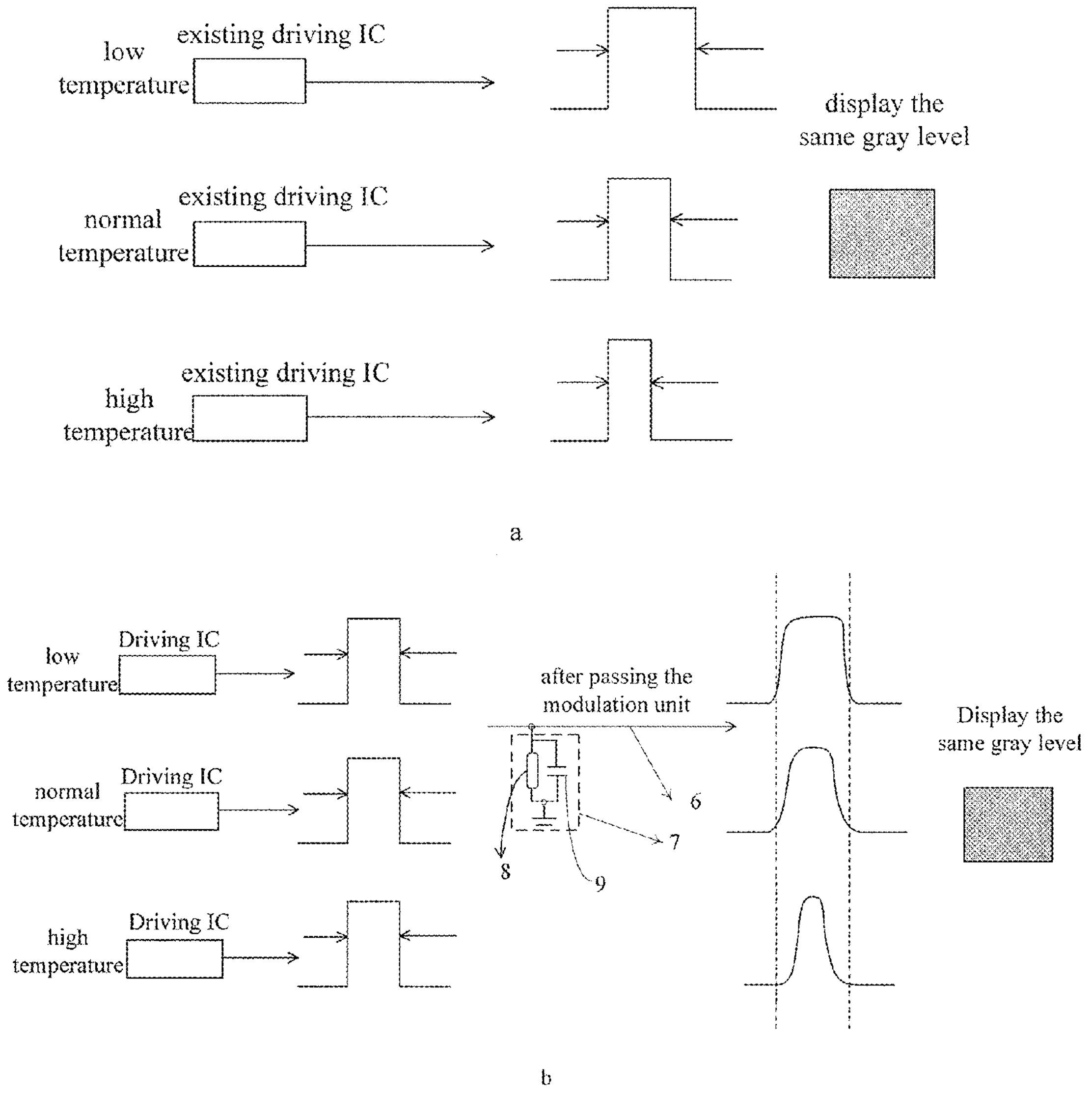
FIG. 6 is a schematic diagram of change of the voltage pulse width in an embodiment of the present disclosure in contrast to the prior art.

A schematic diagram of change of the voltage pulse width in an embodiment of the present disclosure in contrast to the prior art is shown in FIG. 6. The output terminal of the data line 6 of the data line driving IC is configured with a modulation unit 7. One terminal of the modulation unit 7 is connected to the output terminal of the data line 6 of data line driving IC, and the other terminal is grounded. In the prior art, as shown in FIG. 6(*a*), when the temperature increases, the response time of the electrophoretic film decreases, and it is necessary to find the voltage pulse width for displaying a specific gray level under this temperature in the look up table to determine the voltage pulse width. In an embodiment of the present disclosure, the output terminal of the data line is configured with a modulation unit consisted of a thermosensitive resistor and a capacitor to narrow the waveform of the voltage signal in order to realize the temperature compensation, as shown in FIG. 6(*b*).

Further, similarly, for a modulation unit formed by connecting a resistor with a thermosensitive capacitor in parallel, the curvature of the temperature characteristic curve of the thermosensitive capacitor should be made to be reverse to the curvature of the temperature characteristic curve of the electrophoretic film. As the thermosensitive capacitor, a nonlinear thermosensitive capacitor with a positive temperature coefficient should be selected. The thermosensitive capacitor with a positive temperature coefficient refers to that the capacitance of the thermosensitive capacitor increases with the increasing of the temperature.

At step 303, the modulation unit is arranged at the output terminal of each data line of the data line driving IC.

Figure 7:
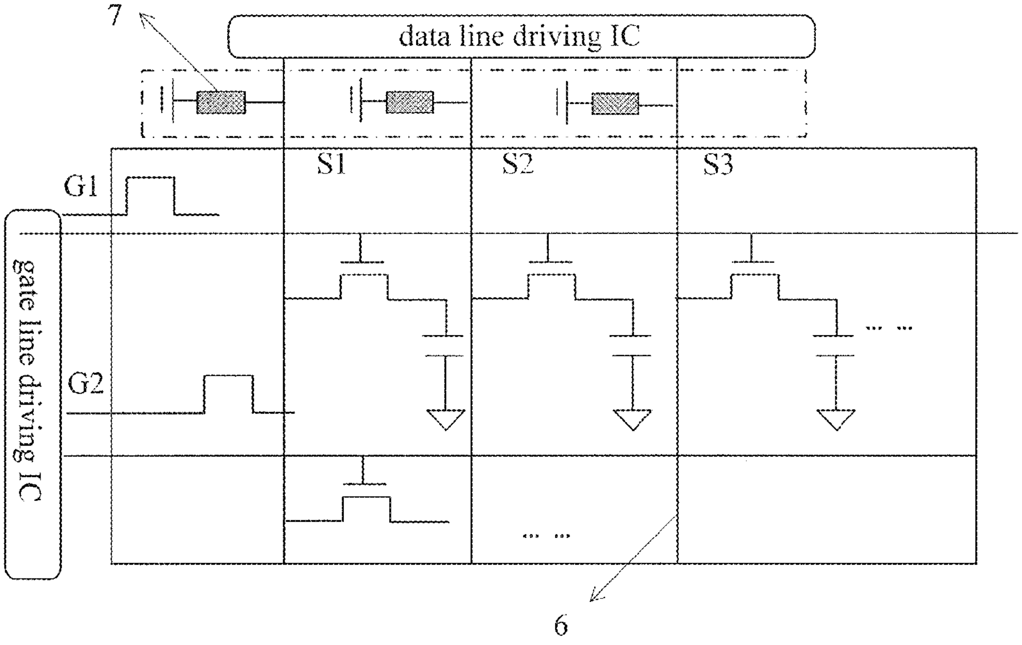
FIG. 7 is an equivalent circuit diagram of a driving circuit according to an embodiment of the present disclosure.

In particular, one modulation unit 7 configured in step 302 is arranged at the output terminal of each data line 6 of the data line driving IC, which can be arranged inside the chip. The equivalent circuit diagram of the formed driving IC is as shown in FIG. 7. One terminal of the modulation unit is arranged at the data line of the data line driving IC.

According to the above implementation method of a driving circuit, in an embodiment of the present disclosure, there is also provided a driving circuit for electrophoretic display, comprising a data line driving integrated circuit and a gate line driving integrated circuit. The output terminal of each data line of the data line driving integrated circuit is configured with a modulation unit comprising a thermosensitive element, and the modulation unit adjusts the voltage signal pulse width according to change of temperature to realize temperature compensation for the dielectric characteristic of the electrophoretic film of the electrophoretic display.

A mentioned in the above, one terminal of each modulation unit is connected to the output terminal of one data line of the data line driving integrated circuit, and the other terminal of the modulation unit is grounded.

A mentioned in the above, the curvature of the curve of the response time of the modulation unit with respect to the temperature is reverse to the curvature of the curve of the response time of the electrophoretic film with respect to the temperature.

As mentioned in the above, the modulation unit can be formed by connecting a thermosensitive resistor with a capacitor in parallel, or by connecting a thermosensitive resistor series consisted of multiple thermosensitive resistors with a capacitor in parallel. The thermosensitive resistor is a nonlinear thermosensitive resistor with a positive temperature coefficient.

As mentioned in the above, the modulation unit can be formed by connecting a resistor with a thermosensitive capacitor in parallel, or by connecting a group of thermosensitive capacitors consisted of multiple thermosensitive capacitors connected in parallel with a resistor in parallel. The thermosensitive capacitor is a nonlinear thermosensitive capacitor with a positive temperature coefficient.

Further, in an embodiment of the present disclosure, there is further provided an electrophoretic display device comprising an array substrate, an electrophoretic film and a peripheral driving circuit. The peripheral driving circuit comprises a driving circuit described in the above, and the output terminals of the data lines of the data line driving IC in the driving circuit are configured with the modulation units described in the above.

As can be seen, the present disclosure modulates the voltage signal pulse width by using a modulation unit to enable the voltage signal pulse to change with the temperature, such as to make the waveform change of the voltage signal coincide with the temperature characteristic of the electrophoretic film, achieving the effect of temperature compensation.

In contrast to the prior art, according to the present disclosure, the look up table is not needed, and thus it is not necessary to measure the dielectric characteristics of different types of electrophoretic films under different temperatures respectively. It is only needed to design a suitable modulation unit in advance according to the temperature characteristic curve of the electrophoretic film, such that the curvature of the curve of the response time of the modulation unit with respect to the temperature is reverse to the curvature of the curve of the response time of the electrophoretic film with respect to the temperature. As such, with the change of the temperature, the pulse waveform of the voltage signal changes. Therefore, according to the present disclosure, the workload of the early stage experiment process of the product design can be saved, the production efficiency of the products can be improved, and the storage space of the chip can also be saved.

The above description is only for illustrating preferable embodiments of the present disclosure, but not for defining the protection scope of the present disclosure.

What is claimed is:

1. A driving circuit for electrophoretic display, comprising a data line driving integrated circuit and a gate line driving integrated circuit, wherein an output terminal of each data line in the data line driving integrated circuit is configured with a modulation unit, a first terminal of the modulation unit is connected to the output terminal of the data line and a second terminal of the modulation unit is grounded, and the modulation unit adjusts a pulse width of a voltage signal outputted at the output terminal of the data line according to change of temperature to realize temperature compensation for dielectric characteristic of the electrophoretic film of the electrophoretic display, the modulation unit is formed by connecting a thermosensitive resistor with a capacitor in parallel, wherein a first terminal of the thermosensitive resistor functions as the first terminal of the modulation unit to be connected to the output terminal of the data line and a second terminal of the thermosensitive resistor functions as the second terminal of the modulation unit to be grounded, or the modulation unit is formed by connecting a thermosensitive capacitor with a resistor in parallel, wherein a first terminal of the thermosensitive capacitor functions as the first terminal of the modulation unit to be connected to the output terminal of the data line and a second terminal of the thermosensitive capacitor functions as the second terminal of the modulation unit to be grounded.

2. The driving circuit for electrophoretic display according to claim 1, wherein a curvature of a curve of a response time of the modulation unit with respect to the temperature is reverse to a curvature of a curve of a response time of the electrophoretic film with respect to the temperature.

3. An implementation method of the driving circuit for electrophoretic display of claim 2, comprising:

determining the curve of the response time of the electrophoretic film with respect to the temperature;

designing the modulation unit and selecting the suitable thermosensitive element according to the curve of the response time of the electrophoretic film with respect to the temperature; and arranging the modulation unit at the output terminal of the data line of the data line driving integrated circuit, wherein the curvature of the curve of the response time of the modulation unit with respect to the temperature is reverse to the curvature of the curve of the response time of the electrophoretic film with respect to the temperature.

4. The implementation method according to claim 3, wherein the thermosensitive resistor is a nonlinear thermosensitive resistor with a positive temperature coefficient.

5. The implementation method according to claim 3, wherein the thermosensitive capacitor is a nonlinear thermosensitive capacitor with a positive temperature coefficient.

6. The driving circuit for electrophoretic display according to claim 1, wherein the thermosensitive resistor is a nonlinear thermosensitive resistor with a positive temperature coefficient.

7. The driving circuit for electrophoretic display according to claim 1, wherein the thermosensitive capacitor is a nonlinear thermosensitive capacitor with a positive temperature coefficient.

8. An electrophoretic display device comprising an array substrate, an electrophoretic film and a peripheral driving circuit, wherein the peripheral driving circuit is the driving circuit according to claim 1.

9. The electrophoretic display device according to claim 8, wherein a curvature of a curve of a response time of the modulation unit with respect to the temperature is reverse to a curvature of a curve of a response time of the electrophoretic film with respect to the temperature.

10. The electrophoretic display device according to claim 8, wherein the thermosensitive resistor is a nonlinear thermosensitive resistor with a positive temperature coefficient.

11. The electrophoretic display device according to claim 8, wherein the thermosensitive capacitor is a nonlinear thermosensitive capacitor with a positive temperature coefficient.

* * * * *